L. C. SCHNEIDER.
PROCESS OF MAKING LONG PIPE COILS.
APPLICATION FILED APR. 26, 1909.
972,928.
Patented Oct. 18, 1910.
2 SHEETS—SHEET 1.
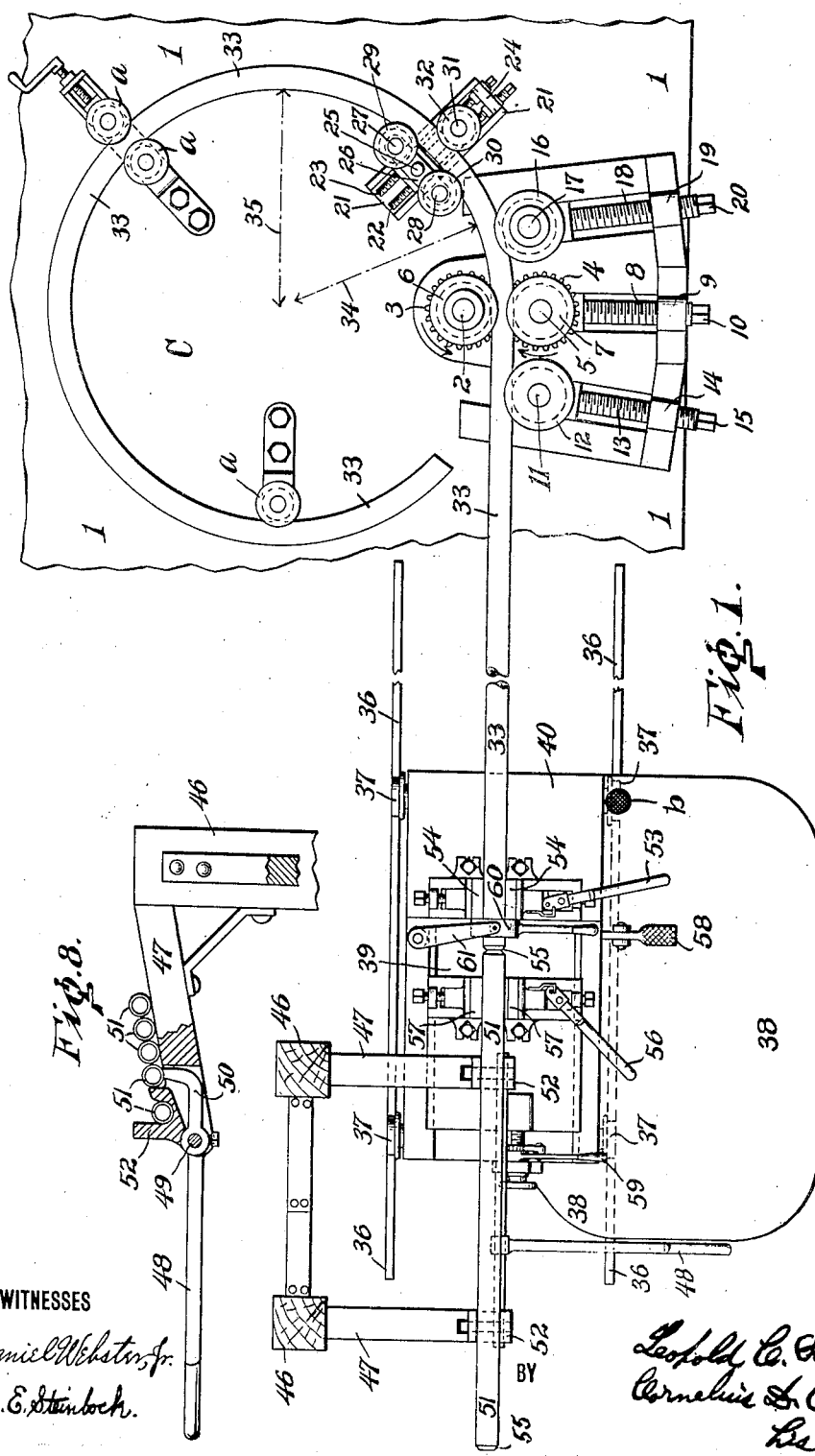

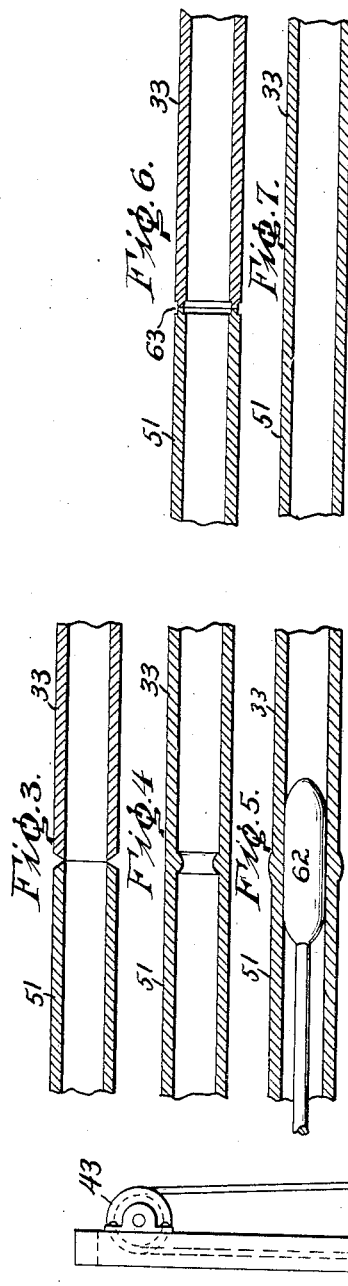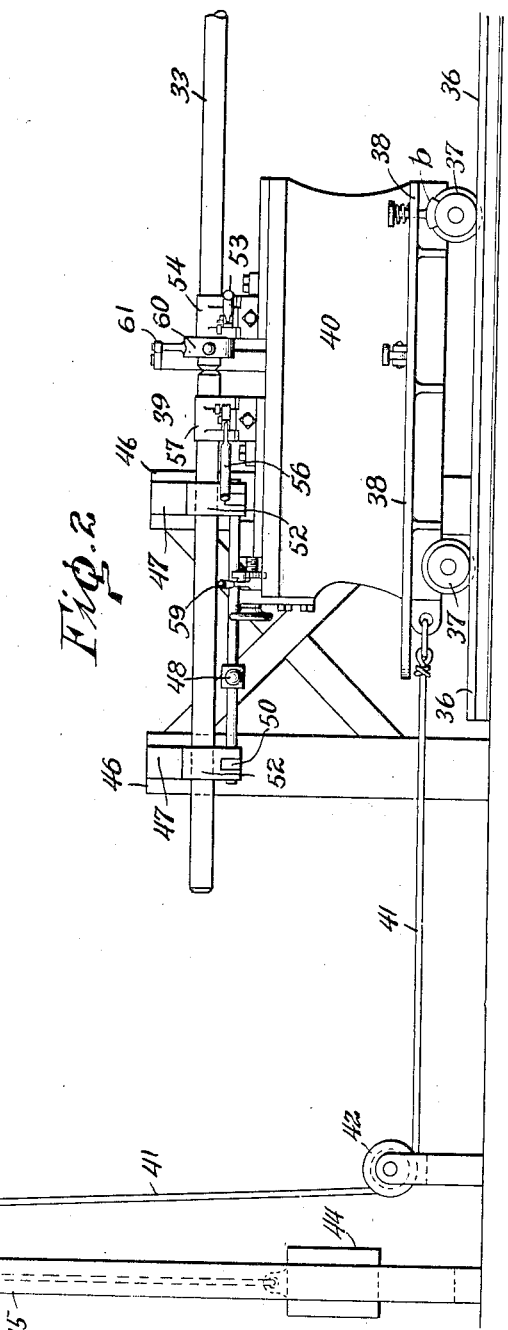

UNITED STATES PATENT OFFICE.

LEOPOLD C. SCHNEIDER, OF PHILADELPHIA, PENNSYLVANIA, ASSIGNOR TO THE PHILADELPHIA PIPE BENDING COMPANY, A CORPORATION OF NEW JERSEY.

PROCESS OF MAKING LONG PIPE-COILS.

972,928.  Specification of Letters Patent.  Patented Oct. 18, 1910.

Application filed April 26, 1909. Serial No. 492,127.

*To all whom it may concern:*

Be it known that I, LEOPOLD C. SCHNEIDER, a citizen of the United States, residing at Philadelphia, county of Philadelphia, and State of Pennsylvania, have invented certain new and useful Improvements in Processes of Making Long Pipe-Coils, of which the following is a specification.

My invention relates to a method or process for making long coils of pipe or rod; that is, for making pipe coils in which the length of the pipe is very great.

Heretofore it has been common practice, in making such a long coil, to first prepare the long pipe by joining all the short lengths of pipe, end to end, until a pipe of the required length was formed, and then proceeding to form the pipe into a coil. This method requires great factory or yard space, for that in the case of a pipe several hundred feet, one thousand feet, or more in length, the long pipe must first be formed by joining a great number of short lengths of pipe, and the single long pipe so formed must lay in a substantially straight direction away from the coiling machine. By my hereinafter described method or process, however, such great space is not required, and I am enabled to coil a pipe of any length, and to produce a more satisfactory coil, in shorter time, and at far less cost.

My invention resides in the method or process which consists in feeding and coiling a standard market length, or any suitable length of pipe, and while it is being fed and coiled, welding thereto a second length of pipe, short as compared with the entire finished pipe, which in turn is coiled as an integral part of the first length; and so on, length after length of pipe is welded to the last length just being fed and coiled. This process is a continuous one and the coiling machine continues in operation just as if the total required length of pipe had first been prepared and then fed and coiled. As a further step in my method or process, I swage the joints between the pipe sections or lengths while the pipe is being continuously fed and coiled.

My invention resides in other matters hereinafter described and claimed.

For an illustration of a mode of carrying out my method or process, reference is to be had to the accompanying drawings, in which:

Figure 1 is a plan view of a coiling machine with associated welding and swaging apparatus, etc., for carrying out my method or process. Fig. 2 is a side elevational view of the movable welding and swaging apparatus. Fig. 3 is a longitudinal sectional view of a fragment of pipe scarfed ready for welding. Fig. 4 is a longitudinal sectional view of the same fragment of pipe after welding. Fig. 5 is a sectional view of a fragment of pipe showing a mandrel within the same. Fig. 6 is a longitudinal sectional view of a fragment of pipe, scarfed in a different manner, prepared for welding. Fig. 7 is a longitudinal sectional view of the same fragment of pipe after welding. Fig. 8 is an end elevational view, partly in section, of a rack for carrying the lengths of stock.

In Fig. 1, C is the coiling machine comprising the base plate 1 upon which is mounted a vertical spindle 2 rotated by an electric motor, or any other suitable source of power. Secured to this spindle 2 is the gear 3 which meshes with the gear 4 mounted upon the spindle 5. Carried by the spindles 2 and 5, respectively, are the rollers 6 and 7 having concave rims to receive the pipe, rod, or other stock, as well understood in the art. The gear 4 and roller 7, mounted upon the spindle 5, are adjustable toward and away from the gear 3 and roller 6 by the screw 8 operating in the bracket 9, and square headed at 10 to receive a wrench or the like. Upon the spindle 11 is mounted a roller 12, also having concave rim and movable inwardly and outwardly under the control of the adjusting screw 13 operating in bracket 14 and having the squared head 15; and on the other side of the rollers 6 and 7 is a roller 16, also having a concave rim, mounted upon the spindle 17 and adjustable inwardly and outwardly by the screw 18, operating in bracket 19, and square headed at 20.

Suitably secured upon the base 1 is a member 21 provided with the screws 22 and 23, both turning loosely in the bearing end 24, each screw being square headed to receive a wrench or other suitable turning means. By the screw 22 a member carrying the pivot 25 may be moved inwardly and outwardly. And upon the pivot 25 is mounted the member 26 extending transversely of the member 21, the member 26 carrying the two spindles 27 and 28 upon which are mounted respectively the rollers 29 and 30, both having concave rims. And by means of the screw 23 the spindle 31 may be moved inwardly or outwardly, a roller 32, having a concave rim, being mounted upon the spindle 31.

The pipe or stock 33 is fed in from the left over the roller 12 and between rollers 6 and 7, these latter frictionally engaging the pipe or stock 33 and feeding the same toward the right. The roll 16 is set inwardly so that the pipe or stock is bent or coiled to tend to take a diameter less than the desired finish diameter. The radius of the coil which this initial bending or coiling tends to form is indicated by the distance 34. The pipe or stock 33 then passes on between roller 32 and the rollers 29 and 30, and the roller 32 is set in so as to cause the over-coiled pipe to straighten slightly, in effect, coiling or bending in opposite direction, so that there results a coil as shown having the desired finish radius, which is very uniform, the finish radius being indicated by the line 35. The rolls 29, 30 and 32 need not be set at any precise distance from the imaginary center of the finished coil, the diameter of the finished coil being determined by the amount the roll 32 is set inwardly toward the rolls 29 and 30. This process of over-coiling and back-coiling is claimed in my Patent No. 928,073, July 13, 1909.

The coiling machine is run continuously, thus continuously feeding, continuously over-coiling, and continuously back-coiling to desired finish diameter. When the first length of pipe has been engaged by the rolls 6 and 7 to feed the same, a second section of pipe is welded thereto while continuously fed and while being operated upon by the coiling machine. Successive relatively short lengths of pipe, such as standard market lengths, are then welded end to end in succession while the coiling machine C continuously operates to produce a coil of the desired diameter, and by welding end to end sufficient sections or lengths of pipe, the coil length may be made anything desired.

To the left of the coiling machine C, as viewed in Fig. 1, is provided a pair of rails 36, 36 upon which travel the wheels 37 carrying the platform or carriage 38. Upon this movable platform or carriage 38 is mounted the welding machine 39 having the base 40. This welding machine may be of any suitable type and is here shown, by way of example, as an electric welding machine, though it is to be understood that any other known welding agent besides electricity may be employed. Attached to the carriage 38 is a rope or cable 41 which runs over the sheaves 42 and 43 and connects with the counterweight 44 movable between the vertical guides 45.

On vertical standards 46 are supported arms 47 overhanging the trackway, and so positioned longitudinally of the trackway that when the carriage is at the left end of its movement the operator, who stands upon the movable platform 38 and who operates the welding and swaging machines, may depress the lever 48, mounted midway between the uprights 46 upon a horizontal rock shaft or pivot 49 carried by the brackets 47, and thus cause the inner end 50 of the lever to raise a length of pipe or stock 51 upwardly from the inclined bracket 47 causing it to roll into the stationary brackets 52 bringing the section or length of pipe 51 into substantial alinement with the pipe 33 which is being operated upon by the coiling machine C. When the lever 48 is again raised, the pipe lengths roll down to the position shown in Fig. 8 ready for the lever 48 to deliver a new section to the brackets 52.

The operation of my method or process is as follows: When the movable carriage is at the left end of its movement, the operator, standing upon the platform 38, operates the lever 53 to clamp the pipe 33, being drawn to the right and coiled by the machine C, between the jaws 54 of the welding machine, electrical contact with the pipe 33 being made through the jaws or in any other manner well understood. This, then, causes the movable carriage to move toward the right toward the machine C, the pipe 33 being fed and coiled by the machine C serving to draw the carriage toward the right, the power for such purpose being delivered to the pipe 33 by the feeding rolls 6 and 7. As the carriage moves toward the right, the operator moves the new section of pipe 51, previously scarfed as shown at 55, 55 into position such that its scarfing abuts the scarfing on the left end of the pipe 33. The operator then manipulates the lever 56 to cause the jaws 57 to clamp the pipe section 51 in the well known manner. The operator then actuates the foot lever 58 which actuates a switch within the base 40 to turn on the current in the welding machine, the electric current then passing from the pipe 33 to pipe 51, or vice versa, through the contacting scarfings 55, bringing the same quickly to a welding heat. During this passage of current the operator manipulates the lever 59 which forces the member carrying the jaws 57 and, therefore, the pipe section 51 toward the right into intimate contact with the left end of the pipe 33. By this process the welding is quickly and efficiently accomplished as well understood in the art. After the welding is accomplished, the operator releases the lever 58 thus breaking the circuit or otherwise diminishing the current, and the swaging machine 60, such, for example, as operated by compressed air, is swung over the newly welded joint to swage the same, the machine being hung from the pivoted lever 61 carried by the welding machine. During this time of clamping the new pipe length 51 and welding it to the pipe 33, and swaging the joint, the carriage has been moving to the right toward the coiling machine C, and before the last length of pipe has been fed and coiled, the welding and swaging operation has been completed. Thereupon, the operator opens the jaws 54, thus releasing the carriage from the moving pipe 33, whereupon the counterweight 44 pulls the carriage to the left, and when it has reached a position such that the jaws 54 come sufficiently close to the end of the section last welded, the jaws are again closed as heretofore described and the operation is repeated. Thus it is seen that as the pipe is continually fed and coiled, successive sections or lengths of pipe are welded to the pipe being coiled, so that a coil of any length of pipe or stock may be formed without interruption of the operation of the coiling machine, and within a small space, the process being rapid, efficient, and cheap.

While the electrical conductors supplying current to the welding machine and the hose delivering the compressed air for the swaging machine 60 have not been shown, it is readily understood that the hose and conductor cables are flexible and sufficiently long between their fixed support and the traveling carriage to follow the carriage easily throughout its movement.

As shown in Fig. 5, a mandrel 62 may be run in from the left end of the pipe length or section 51, after the weld is made, to the place where a joint has been made to maintain the inside of the pipe smooth and to form a backing during the swaging operation.

In Fig. 6, the scarfing 63 is shown as a rectangular tongue or tenon of less outside diameter than the outer diameter of the pipe and of greater inside diameter than the inner diameter of the pipe. A scarfing of this form under the action of welding will allow the welded metal to fill up the spaces formed by the scarfing with a resultant substantially interiorly and exteriorly smooth joint.

While the coiling machine hereinbefore described as useful in connection with my improved process or method is of a type to produce circular or round coils, it is to be understood that my process is equally applicable to cases where the coil formed is not round, but where an elliptical coil, box coil, or coil of any other shape, is formed, as well as in the case where a so-called "zig-zag" coil is formed.

What I claim is:

1. The process of making a coil of pipe, which consists in continuously feeding and coiling a section of pipe, and while thus continuously fed welding to said pipe a second section of pipe.

2. The process of making a coil of pipe of great length, which consists in continuously feeding and coiling a length of pipe, and while thus continuously fed welding thereto a second length of pipe, and then continuously feeding and coiling said second length of pipe.

3. The process of making a coil of pipe, which consists in continuously feeding and coiling a length of pipe, and while thus continuously fed welding thereto a second length of pipe while the first length is moving through a substantially definite distance, and then continuously feeding and coiling said second length of pipe.

4. The process of making a pipe coil, which consists in continuously feeding and coiling a length of pipe, and while said length of pipe is thus moving, welding thereto successive lengths of pipe.

5. The process of making a pipe coil, which consists in continuously feeding and coiling a length of pipe, and, while said length of pipe is thus moving and without interruption of the coiling process, welding thereto successive lengths of pipe.

6. The method of making a coil of pipe, which consists in feeding and coiling a length of pipe, and while said length of pipe is thus moving, welding thereto another length of pipe, and swaging the joint.

7. The method of making a pipe coil, which consists in continuously feeding and coiling a length of pipe, and while said pipe is thus moving and without interruption of the coiling process, welding thereto successive lengths of pipe, and swaging the joints before they reach the coiling stage.

8. The method of making a coil of pipe from a plurality of pipe lengths, which consists in continuously feeding and coiling a length of pipe, and while said length of pipe is thus moving, welding thereto a second length of pipe.

9. The method of making a coil of pipe from a plurality of pipe lengths, which consists in continuously feeding and coiling a length of pipe, and while said pipe is thus moving and without interruption of the coiling process, welding thereto another length of pipe, and while said pipe is moving and without interruption of the coiling process, swaging the joint before it reaches the coiling stage.

In testimony whereof I have hereunto affixed my signature in the presence of the two subscribing witnesses.

LEOPOLD C. SCHNEIDER.

Witnesses:
ELEANOR T. MCCALL,
A. E. STEINBOCK.